Figure 1:
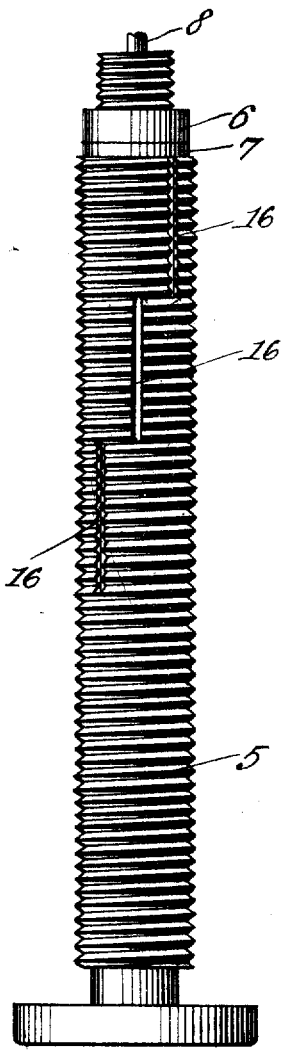

W. C. FAIRES.
TIRE VALVE.
APPLICATION FILED SEPT. 27, 1917.

1,269,694.

Patented June 18, 1918.

Inventor
W. C. Faires

UNITED STATES PATENT OFFICE.

WILLIAM CURTIS FAIRES, OF MOUNT GILEAD, OHIO.

TIRE-VALVE.

1,269,694.  Specification of Letters Patent.  Patented June 18, 1918.

Application filed September 27, 1917. Serial No. 193,489.

*To all whom it may concern:*

Be it known that I, WILLIAM CURTIS FAIRES, a citizen of the United States, residing at Mount Gilead, in the county of Morrow and State of Ohio, have invented new and useful Improvements in Tire-Valves, of which the following is a specification.

This invention relates to valves employed in connection with the inner tube of pneumatic tires, and its object is to provide an inflation valve which has novel and improved means for relieving the tire of any excess internal pressure which may develop from overheating or other causes.

The object stated is attained by means of a combination and arrangement of parts to be hereinafter described and claimed and in order that the same may be better understood, reference is had to the accompanying drawing forming a part of this specification.

Figure 2:
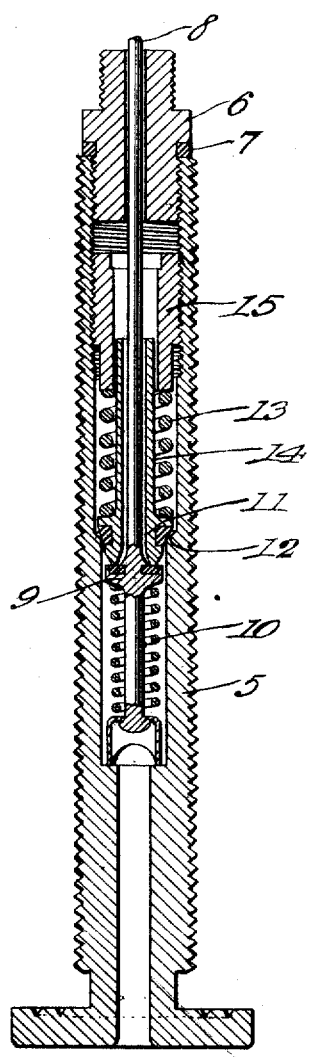

In the drawing,

Figure 1 is an elevation of the device, and Fig. 2 is a longitudinal section thereof.

Referring specifically to the drawing, 5 denotes the usual stem of a tire inflating valve, said stem having at one end the ordinary means whereby it is attached to the tire tube. The other end of the stem is closed by a removable screw plug 6, with a washer 7 interposed between said parts to make an air tight joint.

The plug 6 has a central longitudinal passageway through which extends loosely the stem 8 of an ordinary inflating valve 9 provided with the usual spring 10 for holding the same seated in closing position.

The valve stem 5 also contains a relief valve for permitting the escape of any excessive pressure which may develop in the tire tube from any cause. This valve comprises a head 11 held normally in engagement with a seat 12 in the stem 5 by a coiled spring 13. The valve head 11 has a guide stem 14 which slidably enters a central longitudinal passageway in a screw plug 15 mounted in the stem 5, the latter being internally threaded to hold said plug.

The valve head 11 and its stem 14 are longitudinally apertured to provide a passageway and to accommodate the valve stem 8 the latter having a sufficiently loose fit therein to allow the air to pass. The spring 13 is coiled around the stem 14 between the valve head 10 and the plug 15.

The valve 9 seats on the inner side of the valve head 11 and when seated it prevents the outward flow of air through the passageway in the valve head and its stem 14. Upon connecting an air supply to the plug 6, the air flows through the passageway therein and also through the passageway in the stem 14 and the valve head 11 and unseats the valve 9, and then flows into the tire tube. The valve 9 therefore functions in the same manner as any ordinary inflation valve.

The valve head 11 is exposed to the pressure in the tire tube, and hence when the pressure becomes great enough to unseat the valve head, the excess pressure is free to escape by passing around the valve head and through the passageways in the plugs 15 and 6. The tension of the spring 13 may be regulated by the plug 15, and hence the relief valve can be set to open at any predetermined maximum air pressure. It will be understood of course that the tension of the spring 10 is less than that of the spring 13.

The structure of the device is simple, and by reason of the few uncomplicated parts, the operation is reliable.

In order to facilitate escape of excess air when the usual valve stem cap is applied to the stem 5, the latter is provided on the outside with a series of grooves 16. These grooves do not run vertically in one straight line from the top to the bottom of the valve stem, as that would permit of entrance of dust and dirt, but as shown in Fig. 1 of the drawing, they are offset relative to each other. The second groove starts at the inner end of the first groove, and the third groove starts at the inner end of the second groove.

I claim:—

A tire valve comprising a hollow externally screw-threaded stem having external longitudinal grooves arranged offset relative to each other, and said stem having an internal valve seat and a passageway therefrom to the outside, a spring-seated valve engaging said seat and having a passageway in communication with the first-mentioned passageway, and a spring-seated valve engageable with the first-mentioned valve over the passageway thereof.

In testimony whereof I affix my signature.

WILLIAM CURTIS FAIRES.

Copies of this patent may be obtained for five cents each, by addressing the "Commissioner of Patents, Washington, D. C."